US012722941B2

(12) United States Patent
Lo Jacono et al.

(10) Patent No.: US 12,722,941 B2
(45) Date of Patent: Sep. 1, 2026

(54) ELEVATOR SYSTEM WITH GUIDE RAIL INSTALLATION BRACKET

(71) Applicant: Inventio AG, Hergiswil (CH)

(72) Inventors: Romeo Lo Jacono, Gravesano (CH); Alessandro D'Apice, Ebikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/870,701

(22) PCT Filed: Jun. 7, 2023

(86) PCT No.: PCT/EP2023/065200
§ 371 (c)(1),
(2) Date: Dec. 2, 2024

(87) PCT Pub. No.: WO2023/237592
PCT Pub. Date: Dec. 14, 2023

(65) Prior Publication Data

US 2025/0333269 A1 Oct. 30, 2025

(30) Foreign Application Priority Data

Jun. 8, 2022 (EP) .................................... 22177822

(51) Int. Cl.
*B66B 7/02* (2006.01)

(52) U.S. Cl.
CPC .................................... *B66B 7/023* (2013.01)

(58) Field of Classification Search
CPC ........ B66B 7/023; B66B 7/024; B66B 19/002
See application file for complete search history.

(56) References Cited

U.S. PATENT DOCUMENTS 1,051,335 A * 1/1913 King ........................ B66B 7/022 187/408
3,741,351 A * 6/1973 Suozzo ................... B66B 13/30 52/30
3,948,358 A 4/1976 Atkey
7,147,086 B2 * 12/2006 Ach ........................ B66B 7/024 187/408
7,165,656 B2 * 1/2007 Valjus ..................... B66B 7/021 187/408
2003/0111297 A1 6/2003 Friedman et al.
2011/0226561 A1 * 9/2011 Santos .................... B66B 7/024 248/220.21

(Continued)

FOREIGN PATENT DOCUMENTS

AU 2021241766 B2 * 6/2024 ............. B66B 7/024
EP 1321416 A1 6/2003

(Continued)

*Primary Examiner* — Minh Truong
(74) *Attorney, Agent, or Firm* — Shumaker, Loop & Kendrick, LLP

(57) ABSTRACT

A mounting bracket for mounting to a hoistway door opening of an elevator system includes a transverse support extending in a first direction and two lateral supports connected to and extending away from the transverse support. The transverse support has a floor fixing portion adapted to be fixed to a horizontal surface of the floor landing at the door opening. Each of the lateral supports has a rail fastening portion that extends parallel to the first direction and includes at least one mounting opening for fastening a guide rail for guiding an elevator car.

17 Claims, 5 Drawing Sheets

(56) References Cited

U.S. PATENT DOCUMENTS

| | | | |
|---|---|---|---|
| 2012/0312640 A1 | 12/2012 | Bjoerni et al. | |
| 2019/0210839 A1 | 7/2019 | Buetler | |
| 2024/0034596 A1 * | 2/2024 | D'Apice | B66B 19/002 |

FOREIGN PATENT DOCUMENTS

| | | | | |
|---|---|---|---|---|
| EP | 1812328 B1 | 9/2018 | | |
| ES | 2505865 A1 * | 10/2014 | | B66B 7/023 |
| WO | 2010104514 A1 | 9/2010 | | |
| WO | 2020127787 A1 | 6/2020 | | |
| WO | 2021191146 A1 | 9/2021 | | |

* cited by examiner

ELEVATOR SYSTEM WITH GUIDE RAIL INSTALLATION BRACKET

FIELD

The invention relates to an elevator system with an installation bracket for connecting guide rails to an elevator shaft in the region of a door-side shaft wall of the elevator shaft.

BACKGROUND

Elevators for conveying persons and goods contain elevator cars that can be moved up and down in an elevator shaft. The elevator cars can be moved in the vertical elevator shaft via support elements, for example in the form of support cables or support belts, by means of a drive unit. In addition to the elevator car, the elevator system usually comprises at least one counterweight, which is moved in the opposite direction in the elevator shaft. In order to ensure that the elevator car is linearly guided in a sufficiently precise manner, guide rails are used, which are fastened in the elevator shaft. T-shaped metal profiles have been known and used for a long time. The guide rails consist of individual guide rail segments, which are fixed in the elevator shaft by means of installation brackets.

EP 1 321 416 A1 discloses a guide rail arrangement for elevators with such an installation bracket. This installation bracket has a U-shape, wherein the crossmember of the installation bracket is fixed to the door-side shaft wall. In addition, the installation bracket has two legs, which extend from the ends of the crossmember into the elevator shaft. Guide rails or guide rail segments are fastened to these legs. Both the crossmember and the legs are accordingly arranged within the cross-sectional area of the elevator shaft, whereby the usable shaft space, i.e. the free cross-sectional area of the elevator shaft that is suitable for the elevator car to move is reduced. In the following, the cross-sectional area of the elevator shaft means the area, viewed in plan view or in the vertical direction, for the empty space assigned to the elevator shaft. The shaft space, i.e. the cross-sectional area of the elevator shaft, which is often rectangular when viewed from above, is limited by the shaft walls.

SUMMARY

It is an object of the present invention to create an elevator system that makes simple and safe installation of the guide rails in the elevator shaft possible. This problem is solved according to the invention by means of an elevator system having the features described herein.

The elevator system comprises a vertical elevator shaft, in which an elevator car can be moved up and down between floors along guide rails. The guide rails are connected to the elevator shaft in the region of a door-side shaft wall of the elevator shaft, wherein the elevator system comprises, for this connection, an installation bracket, to which the guide rails are fastened, at least for one floor, preferably one each for multiple floors and particularly preferably one each for each floor. The installation bracket preferably forms a U-shaped bracket structure with a crossmember and two side members. The crossmember extends along the door-side shaft wall. The two side members projecting from the crossmember into the shaft space are preferably arranged at the ends of the crossmember. The crossmember has a horizontal floor fixing portion, which rests on and is fixed to a horizontal surface of the floor landing so that the crossmember is advantageously arranged substantially entirely within the floor landing. Consequently, in this preferred case, substantially only the side members are positioned or arranged in the shaft space. Each of the side members has a rail fastening portion, which extends in parallel with the door-side shaft wall, is provided at the front end of the side member and has at least one mounting hole for fastening the guide rail. Because the crossmember can be arranged substantially entirely within the floor landing, the installation of the elevator system can be ensured with increased safety for the installer. The invention is based on the finding that only the arrangement of the shaft doors is decisive for the positioning of all essential components of the elevator car that relate to the movability of the elevator car. Accordingly, the installation bracket for fixing the guide rails in the elevator shaft is to be aligned in relation to the shaft door that is installed or is to be installed. Consequently, it may be sufficient for the installation bracket to be fastened exclusively in a region of the substantially horizontally aligned floor surface. A further advantage is the improved use of space in the elevator shaft. On the one hand, this is because the installation bracket can be fastened to the horizontal floor surface and substantially only the side members are thus arranged in the shaft space and impinge on the shaft space. While on the other hand, in combination therewith, the front-side mounting of the guide rails on the side members also leads to optimized use of space. The special installation bracket also provides structural advantages since a particularly reliable and stable connection of the guide rails to the elevator shaft in the region of the door-side shaft wall is thus achieved.

The main components, i.e., the crossmember and the two side members of the installation bracket, have the following purpose: the crossmember comprising the at least one floor fixing portion serves to fasten the installation bracket to the elevator shaft. The guide rails are fixed to the side members.

The guide rails may be designed as hollow profiles.

For easy installation, it may be advantageous for the at least one mounting hole in the rail fastening portion to be designed as an elongated hole. The elongated hole can accommodate fastening screws or fastening bolts for fastening the guide rails.

The installation bracket may be of a one-piece or multi-piece construction. A one-piece installation bracket may, for example, be designed as a rigid bent part made of sheet metal. The side members and the crossmember may be made from a common sheet metal blank to form a common bent part. In the multi-piece variant, at least the side members and preferably also the crossmember may each be designed as rigid bent parts made of a sheet metal. The multi-piece design increases variability and has the advantage that the installation bracket can be easily adapted to various shaft dimensions.

Each side member may have a horizontal web portion extending from the crossmember to the guide rail. The rail fastening portion may adjoin the horizontal web portion at a right angle and, if the crossmember is made of a sheet metal, may be connected to the horizontal web portion via a folded edge. For example, the horizontal web portion may be flush with the horizontal floor fixing portion of the crossmember.

It may be particularly advantageous that, if each side member is designed as a rigid bent part made of a sheet metal, the crossmember has a vertical web portion which is connected to the horizontal web portion via a folded edge. This results in a stable yet lightweight structure.

The crossmember may have a vertical member wall portion, which adjoins the floor fixing portion and, if made of sheet metal, is preferably created by a folded edge, as a stop to the door-side shaft wall or for abutting against the door-side shaft wall. It is therefore apparent that the member wall portion is the only element of the crossmember that is located in the elevator shaft or arranged in the shaft space. The other elements of the crossmember, i.e., the floor fixing portion, are associated with the floor or the floor landing. The member wall portion extending in the horizontal direction preferably between the side members can terminate the crossmember toward the elevator shaft.

The crossmember is to be arranged substantially entirely within the floor landing. However, it is necessary that, in the case of an arrangement in each case of such an installation bracket on a plurality of shaft doors of the elevator installation, all of these installation brackets are aligned according to a direction of travel of the elevator car, usually vertically. Dimensional tolerances during the manufacture of the elevator shaft can then have the consequence that the crossmember of the installation bracket projects slightly into the shaft space of the elevator shaft. This slight projection still satisfies the requirement of the crossmember being arranged substantially entirely within the floor landing or, more precisely, within a vertical projection of the floor landing.

The floor fixing portion may have mounting holes for screw connections or other fastening elements for fastening the installation bracket to the floor landing. The mounting holes can be designed such that the installation bracket can be or is adjustably fixed to the floor landing. “Adjustably fixed” or “can be adjustably fixed” means that such a preliminary fixing is made possible before a final alignment and subsequent final fixing of the installation bracket. For example, this can be achieved by means of a threaded connection which enables a horizontal sliding movement of the installation bracket in its preliminary fixed state. In this case, the floor fixing portion designed as a passage opening, for example, can be designed to be larger than the dimension of the screw requires, by means of which the installation bracket is fastened or can be fastened to the floor landing. A spacer formed for example in accordance with a washer causes the installation bracket to be preliminarily fixed or finally fixed to the floor by the degree to which it is pressed against the installation bracket by means of the screw. Such an adjustability makes preliminary fixing of the installation bracket to the floor landing and subsequent alignment and final fixing of the installation bracket in the elevator shaft possible by means of alignment elements that can be arranged in the elevator shaft.

Simple and reliable installation can be achieved if the floor fixing portion has a plate-like and flat support structure, preferably formed by sheet metal, which support structure extends over the entire length of the crossmember.

The floor fixing portion can act on a horizontal surface on the floor landing that is at least as large as the cross-sectional areas of the guide rails. On account of the sufficiently large horizontal support surface, the guide rails can be safely installed in the elevator shaft from the door-side shaft wall.

The shaft door can be arranged in the vertical projection above the floor fixing portion. The floor fixing portion of the crossbeam can thus be used as a suitable platform which supports the bottom of the shaft door.

The shaft door that can be provided for installation on the installation bracket comprises at least one door leaf. Essential components of the shaft door can comprise this at least one door leaf of this shaft door and/or a door sill and/or at least one door leaf guide rail for guiding this at least one door leaf. In addition, the shaft door can contain coupling elements, which are needed for the mechanical coupling of the car door to the shaft door. These coupling elements can project into the cross-sectional area of the elevator shaft.

A further aspect of the invention then relates to an installation bracket for an elevator system for mounting on a shaft door opening and in particular for the elevator system described above. The installation bracket preferably forms a bracket structure which is U-shaped when viewed from above and has a crossmember extending in a first direction and two side members which protrude from the crossmember and each extend in a second direction which extends transversely and preferably at a right angle to the first direction. The crossmembers and the two side members are preferably arranged relative to one another in such a way that they define the aforementioned “U”. When the installation bracket is installed in the elevator system, the first direction is determined by the door-side shaft wall along which this direction runs. The crossmember has a floor fixing portion which can be fixed to a horizontal surface of the floor landing such that the crossmember can be arranged substantially entirely within the floor landing, while the side members can be arranged substantially only in the shaft space. Each of the side members has a rail fastening portion which extends in parallel with the first direction and has at least one mounting hole for fastening a guide rail for guiding an elevator car. The rail fastening portion can be provided at the front end or the end of the crossmember facing away from the crossmember.

DESCRIPTION OF THE DRAWINGS

Further individual features and advantages of the invention emerge from the following description of exemplary embodiments and from the drawings. In the drawings.

DETAILED DESCRIPTION

Figure 1:
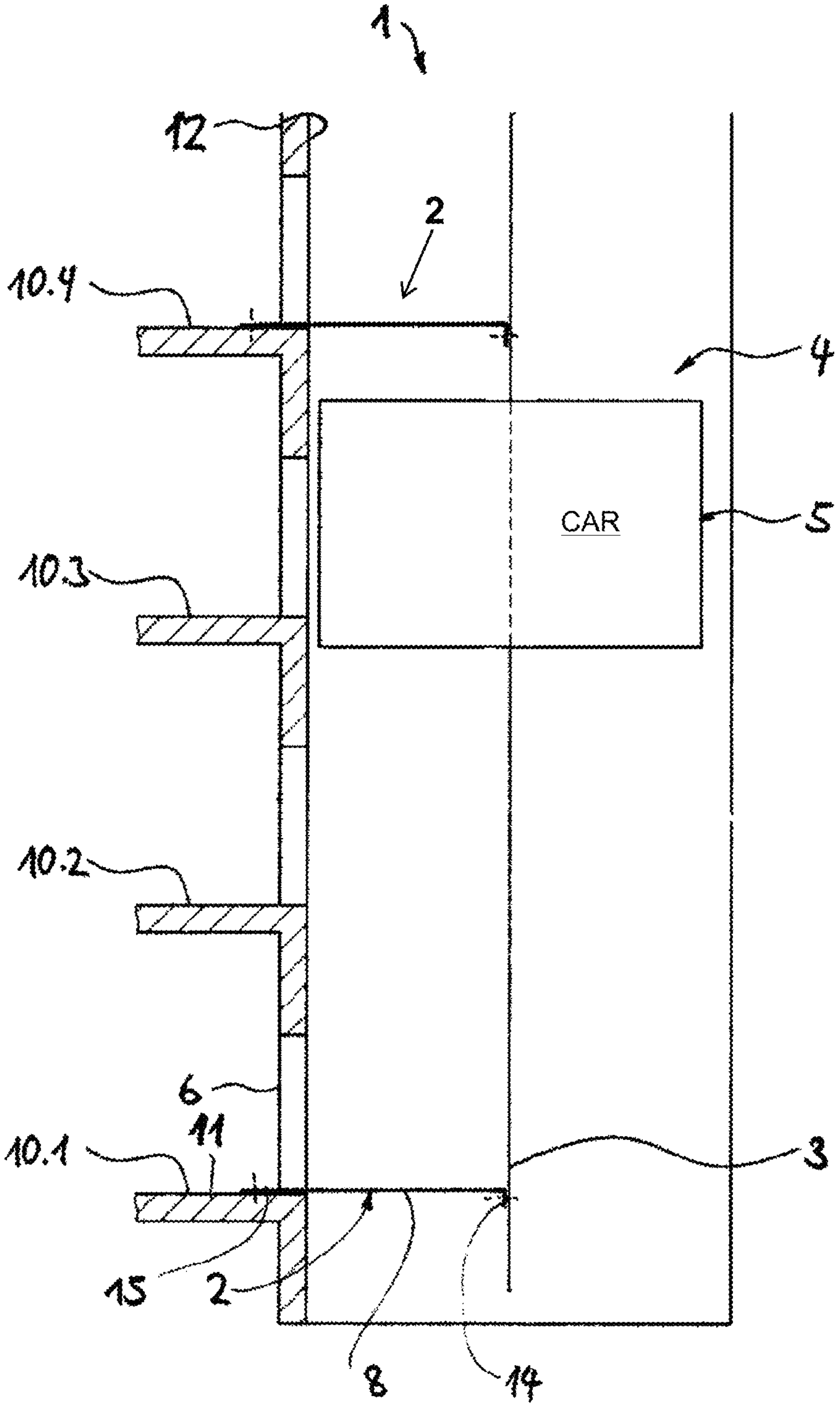
FIG. 1 is a schematic side view of an elevator system according to the invention.

FIG. 1 shows an elevator system, designated overall with 1. Elevators are used for vertical transport in multi-story buildings. The building shown as an example has an elevator shaft 4 in which an elevator car 5 can be moved up and down to individual floors 10.1, 10.2, 10.3, 10.4. The vertical elevator shaft 4 is delimited by a shaft floor at its lower end. The elevator shaft 4 has a shaft door opening 6 in the form of a wall opening for each floor 10.1, 10.2, 10.3, 10.4. The shaft door opening 6 provides access from the floor into the elevator car 5. The elevator shaft 4 is delimited laterally by a door-side shaft wall 12.

The elevator car 5 is moved by support elements (not shown here), to which the elevator car 5 is fastened; the support elements may be one or more support cables or support belts. The elevator car 5 may, for example, be self-supporting or be arranged in a supporting structure, such as a supporting frame. In the present case, the elevator car 5 shown in FIG. 1 has, in simplified form by way of example, a cuboid car body and comprises a car floor, car walls and a ceiling. Furthermore, the elevator car 5 usually has a car door (not shown), which closes off the interior of the elevator car 5 and which faces the door-side shaft wall 12.

For guiding the elevator car 5, guide rails 3 are arranged in the elevator shaft 4. The elevator car 5 can be moved up and down along the guide rails 3 between the floors 10.1, 10.2, 10.3, 10.4. As can be seen, the guide rails 3 are connected to the elevator shaft 4 in the region of the door-side shaft wall 12 via installation brackets designated with 2. For connection to the guide rails 3, the elevator system 1 comprises, by way of example for floors 10.1 and 10.4, an installation bracket 2 to which the guide rails 3 are fastened. Preferably, each floor 10.1, 10.2, 10.3, 10.4 comprises such an installation bracket 2, to which the guide rails 3 are fastened. The installation bracket 2 has a horizontal floor fixing portion 15, which rests on a horizontal surface of the floor landing 11 and is fixed thereto. Side members 8 adjoin the floor fixing portion 15, wherein a respective rail fastening portion 14, to which the respective guide rail 3 is fastened, is provided at the front end of each side member 8. The rail fastening portion 14 has one or more mounting holes (not shown here) for fastening the guide rail 3. The corresponding fastening elements are indicated by short dashed lines.

The elevator of FIG. 1 may be designed as a traction elevator system 1 and, in addition to the elevator car 5, may have at least one counterweight (not shown) that can be moved in the opposite direction to the elevator car 5. According to an exemplary embodiment of the elevator system 1, special guide rails 3 may be used, which serve as linear guides both for the elevator car 5 and for two counterweights. The traction elevator system 1 may have two drives (not shown) for this purpose. In this case, the two drives (e.g., Koepe sheave drives) drive the respective support elements and thus move the elevator car 5 and the two counterweights in opposite directions. Each drive is associated with one of the counterweights. Two mutually opposite guide rails 3 are provided on both sides of the elevator car 5 to guide the elevator car 5 and the counterweights. In this case, the elevator system may have special guide rails 3, which serve as linear guides for both the elevator car 5 and the respective counterweights. The guide rails 3 may be manufactured as one-piece rolled profiles. The guide rails 3 may be hollow profiles, for example, manufactured as one-piece rolled profiles. Further details on the design of such special guide rails and on the guidance of the car and the counterweights with common guide rails can be found in WO 2020/127787 A1.

The installation bracket 2 makes an advantageous fixing of the guide rails 3 in the elevator shaft possible. The elevator system 1 may comprise a plurality of installation brackets, with each of these installation brackets being fixed separately to another of the floors 10.2, 10.3, 10.4 located above the lowest floor 10.1. In order to relieve the installation bracket 2 associated with the floor 10.1, the guide rail 3 or a guide rail segment fixed to the installation bracket 2 may be positioned on the shaft floor of the elevator shaft 4, in particular may be supported by this shaft floor.

Figure 2:
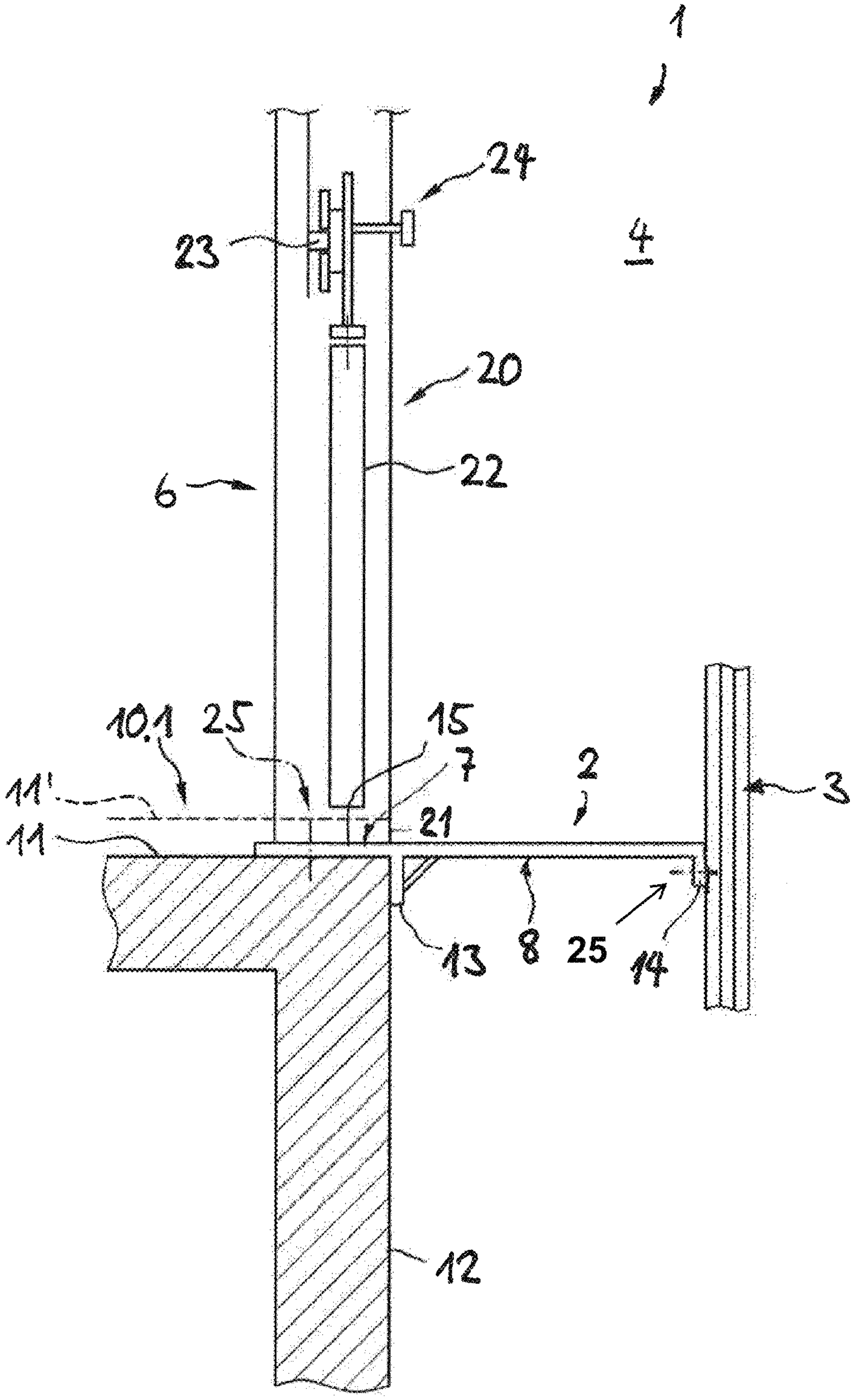
FIG. 2 is a simplified side view of an installation bracket according to the invention mounted on a floor landing of an elevator shaft.

FIG. 2 shows a shaft door opening 6 arranged on a floor landing 11. A shaft door 20 is arranged at this shaft door opening 6. The floor landing 11 comprises, for example, a horizontal concrete surface 11 and may comprise a walk-on surface 11' that can be walked on during conventional use of the floor 10.1, wherein the walk-on surface 11' may be formed, for example, by application of screed.

The installation bracket 2 for fixing the guide rail 3 is therefore fixed to the floor landing 11 by means of the floor fixing portion 15, preferably before application of the exemplary screed to the concrete surface. A door sill 21 is arranged above the floor fixing portion 15 so that the door sill 21 forms a substantially flat surface with the walk-on surface 11'. In addition, the door sill 21 may be integrated in the walk-on surface 11' such that the walk-on surface 11' does not form an offset or a groove or the like.

It can also be seen from FIG. 2 that the floor fixing portion 15, preferably formed by a crossmember 7, is closed by a member wall portion denoted by 13. This member wall portion 13 forms a vertical stop which rests against the door-side shaft wall 12.

Essential components of the shaft door 20 are arranged in the vertical alignment of the floor landing 11. This means that these essential components of the shaft door 20 are arranged outside the shaft space of the elevator shaft 4. The essential components of the shaft door 20 comprise, for example, the door sill 21, a door leaf 22 and a guide rail 23 for guiding the door leaf 22. In addition, the shaft door 20 may comprise further door leaves 22, wherein the shaft door 20 may be designed to close centrally or telescopically.

In addition, the shaft door 20 may, for example, comprise coupling elements 24 for mechanical coupling to a coupling unit (not shown) arranged on the elevator car 5. Accordingly, the elevator car 5 may comprise a car door having a door drive motor. This door drive motor is provided, for example, for a synchronous opening/closing of the shaft door coupled to the car door and, if applicable, also for unlocking the car door and/or the shaft door. With respect to the shaft door 20, the coupling unit accordingly fulfills the purpose of establishing an operative connection between the door drive motor and the shaft door 20. Such coupling elements 24 accordingly project into the shaft space or the cross-sectional area of the elevator shaft 4.

As can be seen in FIG. 2, the shaft door 20 is arranged exactly in the vertical projection above the floor fixing portion 15.

It can furthermore be seen in FIG. 2 that the side member 8 has a rail fastening portion 14, which extends in parallel with the door-side shaft wall 12, is provided at the front end of the side member and has a mounting hole 18 (FIG. 4) for fastening the guide rail 3 by means of fastening elements indicated by 25. Screw connections are in particular suitable as fastening elements.

Figure 3:
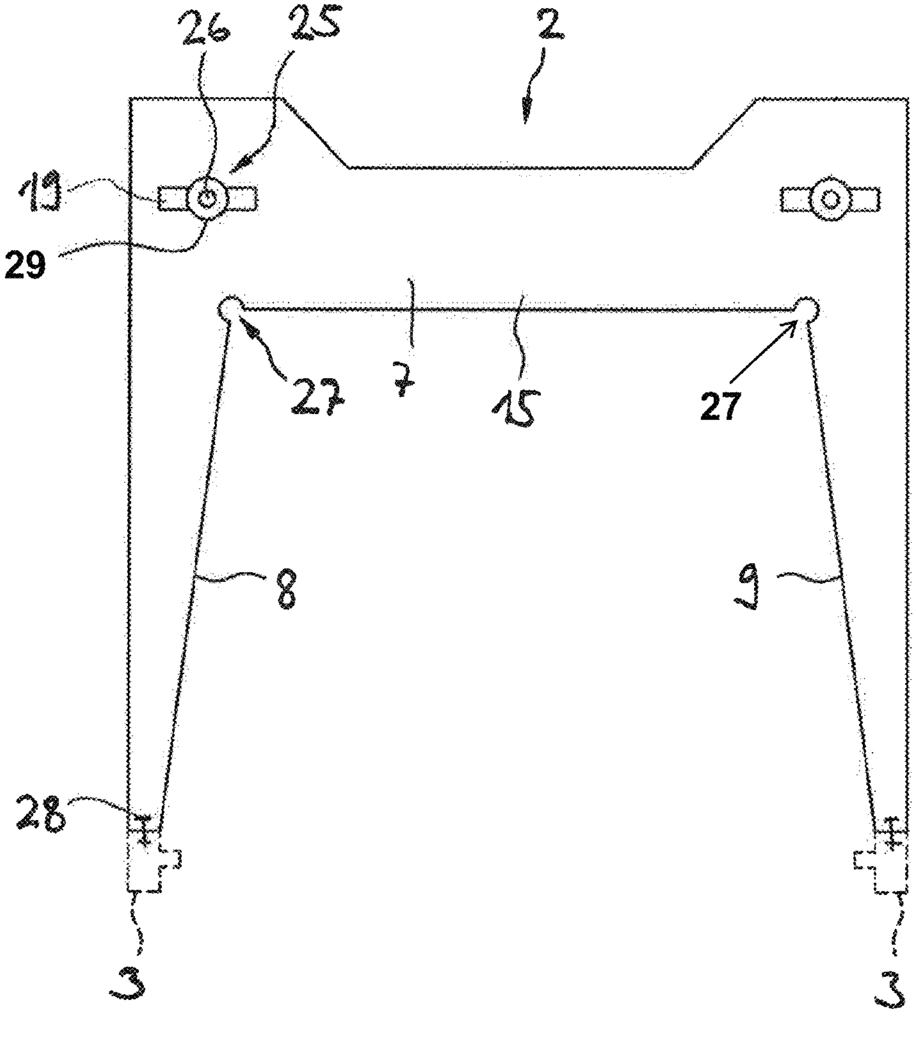
FIG. 3 is a plan view of an installation bracket according to a further embodiment.

FIG. 3 shows an installation bracket 2 for an elevator system of the type described above. The installation bracket 2 comprises the crossmember 7 and two side members 8 and 9 extending at a right angle to the crossmember 7. A respective guide rail 3 is or can be fastened to the ends of these side members 8, 9 by one or more screws 28.

The installation bracket 2 comprises the floor fixing portion 15, which is arranged along the crossmember 7 for directly fixing the crossmember 7 to a floor landing. By way of example, the installation bracket 2 can be fixed with screws 26, which are to be anchored in the floor landing, or similar fastening elements. In the floor fixing portion 15, mounting holes 19 created by holes or bores are arranged. By means of such mounting holes 19, the installation bracket 2 can be fixed adjustably to the floor landing. Accordingly, a washer 29 can be used for adjustable fixing. Adjustment points 27 make adjustability possible with respect to further installation brackets 2 arranged in the elevator shaft, by means of exemplary plumb lines or comparable alignment elements such as laser beams suitable for aligning the installation bracket 2.

In plan view, the installation bracket 2 forms a U-shaped bracket structure. The crossmember 7 extending along the door-side shaft wall 12 and the two side members 8, 9 projecting from the crossmember into the shaft space form this "U".

Figure 4:
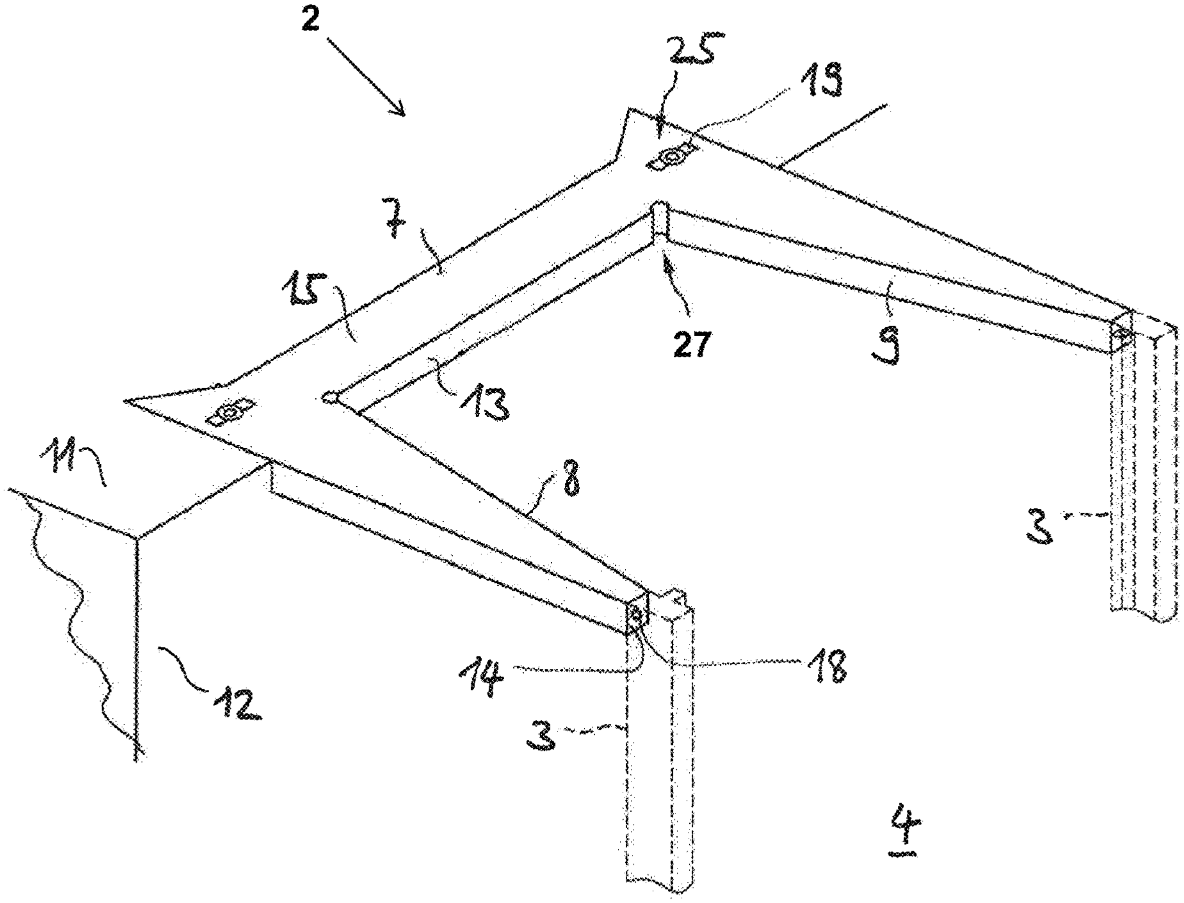
FIG. 4 is a perspective view of the installation bracket from FIG. 3 installed on the floor landing.

FIG. 4 shows an installation bracket 2 fixed to a floor landing 11. By means of the crossmember 7 thereof, the installation bracket 2 is fixed directly to the concrete surface of the floor landing 11. The crossmember 7 has a folded edge for forming the vertical member wall portion 13, which can be arranged at the end of the floor landing delimited by the elevator shaft. The member wall portion 13 forms a stop toward the door-side shaft wall 12 and can terminate the crossmember 7 toward the elevator shaft 4. As can be seen, the member wall portion 13 extends in the horizontal direction between the side members 8 and 9. When the installation bracket 2 is properly fixed to the floor landing, the folded edge or the member wall portion 13 preferably projects vertically downward so that a minimum distance between the guide rail that can be fixed to the installation bracket 2 and the floor landing can be maintained by means of the folded edge.

The crossmember 7 has the floor fixing portion 15, which rests on the horizontal surface of the floor landing 11 and is fixed thereto so that the crossmember 7 is arranged substantially entirely within the floor landing 11. Substantially only the side members 8, 9 are thus arranged in the shaft space. Each of the side members 8, 9 has a rail fastening portion 14 which extends in parallel with the door-side shaft wall 12 and has at least one mounting hole 18 for fastening the guide rail 3 shown in outline. As an example, the guide rails 3 are designed as T-shaped rail profiles. Of course, differently shaped rail profiles could also be fastened to the installation bracket 2. The special front-side connection of the guide rail 3 to the installation bracket 2 is in particular suitable for guide rails 3 designed as hollow rails. FIG. 4 shows that the floor fixing portion 15 extends over an area of the horizontal surface of the floor landing 11 that is at least as wide as a distance between the rail fastening portions 14 for fastening the guide rails 3.

Figure 5:
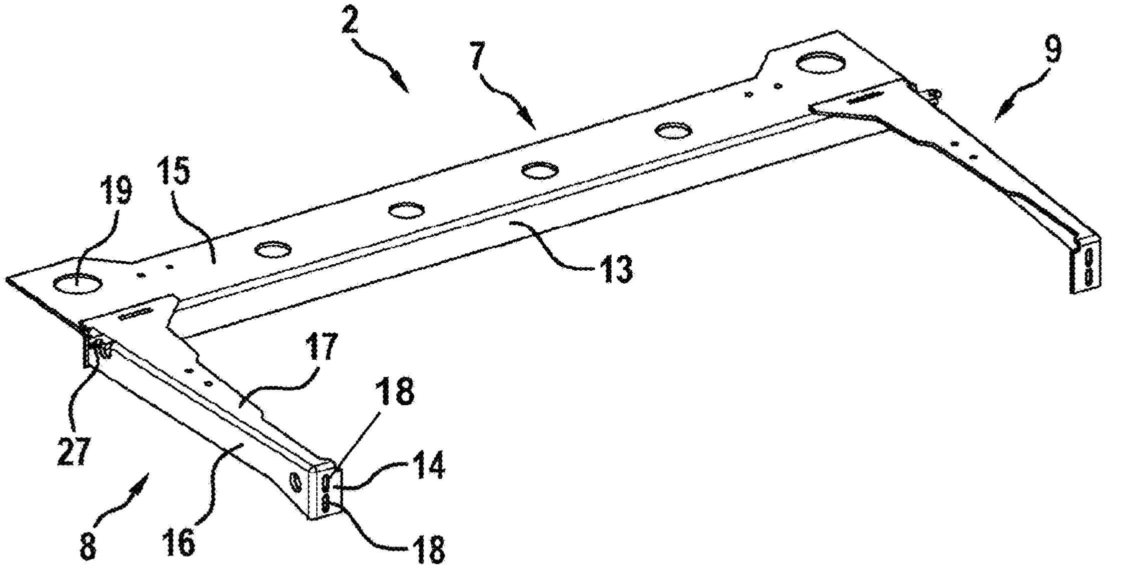
FIG. 5 is a perspective view of a further installation bracket.

FIG. 5 shows structural details of a further variant of an installation bracket 2 for an elevator system 1 for mounting on a shaft door opening. The installation bracket 2 with the crossmember 7 and the two side members 8, 9 forms a U-shaped bracket structure. The crossmember 7 extends in a first direction, which direction is predetermined by the door-side shaft wall when the installation bracket 2 is mounted. The crossmember 7 then extends along the door-side shaft wall. The two side members 8, 9 projecting away from the crossmember 7 each run in a second direction perpendicular to the first direction. The crossmember 7 has a floor fixing portion 15, which can be fixed to a horizontal surface of the floor landing 11 such that the crossmember 7 can be arranged substantially entirely within the floor landing. Substantially only the side members 8, 9 can thus be arranged in the shaft space of the elevator shaft. Each of the side members 8, 9 has a rail fastening portion 14, which extends in parallel with the first direction, is provided at the free end of the side member and has two mounting holes 18. The two mounting holes 18 are used to fasten a guide rail (not shown). Instead of the two mounting holes 18 shown as examples, only one mounting hole 18 or possibly even more than two mounting holes are of course also conceivable for each rail fastening portion 14. The at least one mounting hole 18 is designed as an elongated hole, which has an advantageous effect with regard to the mountability. The elongated hole can accommodate fastening screws or fastening bolts for fastening the guide rails.

The side members 8, 9 and the crossmember 7 are each designed as rigid bent parts made of a sheet metal (e.g., steel sheet). Instead of the multi-piece design, the installation bracket 2 may also be designed in one piece and be made from a single or common sheet metal cut. The crossmember 7 has a vertical member wall portion 13, which adjoins the floor fixing portion 15 and is created by a folded edge, as a stop to the door-side shaft wall. Each side member 8, 9 has a horizontal web portion 17 and a vertical web portion 16. Details regarding orientation (horizontal and vertical) relate to the situation after installation. The vertical web portion 16 is integrally connected to the horizontal web portion 17 via a folded edge. The two web portions 16 and 17 extend from the crossmember 7 to the guide rail. The member wall portions 13 are respectively arranged at the front end of the side members 8, 9. In the present case, the rail fastening portion 14 adjoins the horizontal web portion 17 at a right angle and is connected to the horizontal web portion 17 via a folded edge.

Figure 6:
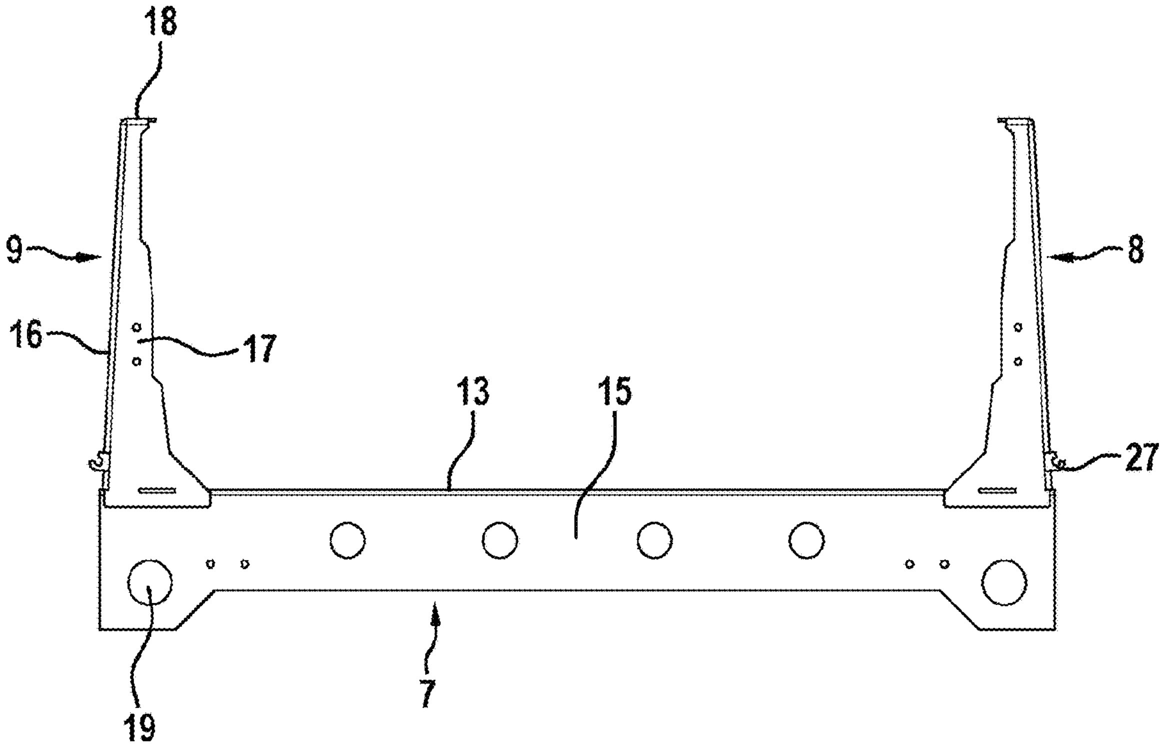
FIG. 6 is a plan view of the installation bracket from FIG. 5.

As is also clear in particular from FIG. 6, the floor fixing portion 15 forms a plate-like support structure, which support structure extends over the entire length of the crossmember 7 (length viewed with respect to the aforementioned first direction). The floor fixing portion 15 is designed to be sufficiently large to rest on the horizontal floor landing. It may be advantageous if the floor fixing portion 15 acts on a horizontal surface on the floor landing that is at least as large as the total cross-sectional areas of the guide rails.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

a vertical elevator shaft in which an elevator car is movable up and down along guide rails between floors;

wherein the guide rails are connected to the elevator shaft at a door-side shaft wall;

an installation bracket connecting the guide rails to the door-side shaft wall at one of the floors;

wherein the installation bracket includes a crossmember extending along the door-side shaft wall and two side members projecting away from the crossmember into the elevator shaft;

wherein the crossmember has a floor fixing portion fixed to a horizontal surface of a floor landing at the one floor; and wherein each of the side members has a rail fastening portion extending parallel to the door-side shaft wall, each of the rail fastening portions having at least one mounting hole adapted to fasten one of the guide rails.

2. The elevator system according to claim 1 wherein the at least one mounting hole is an elongated hole.

3. The elevator system according to claim 1 wherein the side members and the crossmember are each formed as bent parts made of sheet metal.

4. The elevator system according to claim 1 wherein the side members and the crossmember are formed from a common sheet metal blank.

5. The elevator system according to claim 1 wherein each of the side members has a horizontal web portion extending from the crossmember to the rail fastening portion, the rail fastening portion adjoining the horizontal web portion at a right angle.

6. The elevator system according to claim 5 wherein the rail fastening portion is connected to the horizontal web portion by a folded edge.

7. The elevator system according to claim 5 wherein the crossmember has a vertical member wall portion adjoining the floor fixing portion, the vertical member wall abutting against the door-side shaft wall.

8. The elevator system according to claim 7 wherein the vertical member wall portion adjoins the floor fixing portion at a folded edge.

9. The elevator system according to claim 1 wherein the crossmember has a vertical member wall portion adjoining the floor fixing portion, the vertical member wall portion abutting against the door-side shaft wall.

10. The elevator system according to claim 9 wherein the vertical member wall portion adjoins the floor fixing portion at a folded edge.

11. The elevator system according to claim 1 wherein the floor fixing portion is formed as a plate support structure that extends over an entire length of the crossmember.

12. The elevator system according to claim 11 wherein the plate support structure is formed of sheet metal.

13. The elevator system according to claim 1 wherein the floor fixing portion extends over an area of the horizontal surface of the floor landing that is at least as wide as a distance between the rail fastening portions for fastening the guide rails.

14. The elevator system according to claim 1 including a shaft door arranged at the one floor above the floor fixing portion in a vertical projection.

15. The elevator system according to claim 1 wherein each of the guide rails has a hollow profile.

16. An installation bracket for mounting at a shaft door opening of an elevator shaft of an elevator system, the installation bracket comprising:

a crossmember extending in a first direction;

two side members connected directly to the crossmember and projecting away from the crossmember in a second direction transverse to the first direction;

wherein the crossmember includes a floor fixing portion adapted to be fixed to a horizontal surface of a floor landing at the shaft door opening; and wherein each of the side members has a rail fastening portion extending in parallel with the first direction, each of the rail fastening portions having at least one mounting hole adapted to fasten the rail fastening portion to a guide rail for guiding an elevator car in the elevator shaft of the elevator system.

17. The installation bracket according to claim 16 wherein each of the guide rails has a hollow profile.

* * * * *